United States Patent
Mehta et al.

(10) Patent No.: US 10,339,303 B2
(45) Date of Patent: Jul. 2, 2019

(54) DETECTION OF MALICIOUS INVOCATION OF APPLICATION PROGRAM INTERFACE CALLS

(71) Applicant: McAfee, LLC, Santa Clara, CA (US)

(72) Inventors: Kunal Mehta, Hillsboro, OR (US); Balbir Singh, Gurgaon (IN); Rajbir Bhattacharjee, Gurgaon (IN)

(73) Assignee: McAfee, LLC, Santa Clara, CA (US)

( * ) Notice: Subject to any disclaimer, the term of this patent is extended or adjusted under 35 U.S.C. 154(b) by 268 days.

(21) Appl. No.: 14/780,536

(22) PCT Filed: Jan. 22, 2015

(86) PCT No.: PCT/US2015/012495
§ 371 (c)(1),
(2) Date: Sep. 26, 2015

(87) PCT Pub. No.: WO2016/118145
PCT Pub. Date: Jul. 28, 2016

(65) Prior Publication Data
US 2016/0371484 A1    Dec. 22, 2016

(51) Int. Cl.
*G06F 21/54*    (2013.01)
*G06F 21/52*    (2013.01)

(52) U.S. Cl.
CPC .............. *G06F 21/54* (2013.01); *G06F 21/52* (2013.01); *G06F 2221/033* (2013.01)

(58) Field of Classification Search
None
See application file for complete search history.

(56) References Cited

U.S. PATENT DOCUMENTS

| 5,899,987 | A | 5/1999 | Yarom |
| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |
| 8,131,825 | B2 * | 3/2012 | Nord ........................ G06F 16/10 709/219 |
| 8,271,996 | B1 * | 9/2012 | Gould ...................... G06F 9/542 719/312 |
| 9,712,486 | B2 * | 7/2017 | Johnson ................... H04W 4/70 |
| 9,930,162 | B2 * | 3/2018 | Campbell ......... H04M 1/72522 |

(Continued)

FOREIGN PATENT DOCUMENTS

WO    2013-103989    7/2013

OTHER PUBLICATIONS

Aleksandar Gargenta; Deep Dive into Android IPC/Binder Framework; Android Builders Summit; 2013.*

(Continued)

*Primary Examiner* — Farid Homayounmehr
*Assistant Examiner* — Olanrewaju J. Bucknor
(74) *Attorney, Agent, or Firm* — Patent Capital Group

(57) ABSTRACT

Particular embodiments described herein provide for an electronic device that includes a binder kernel driver. The binder kernel driver can be configured to receive an application program interface (API) call, extract metadata from the API call, determine that the API call should be hooked based on the extracted metadata, and hook the API call.

19 Claims, 9 Drawing Sheets

(56) References Cited

U.S. PATENT DOCUMENTS

| | | | |
|---|---|---|---|
| 2006/0150256 A1* | 7/2006 | Fanton | G06F 21/10 726/27 |
| 2006/0174078 A1 | 8/2006 | Robinson | |
| 2007/0016914 A1* | 1/2007 | Yeap | G06F 21/554 719/328 |
| 2007/0101435 A1* | 5/2007 | Konanka | G06F 21/52 726/27 |
| 2007/0250817 A1* | 10/2007 | Boney | G06F 21/56 717/124 |
| 2008/0127292 A1 | 5/2008 | Cooper et al. | |
| 2009/0049550 A1* | 2/2009 | Shevchenko | G06F 21/56 726/23 |
| 2010/0031361 A1* | 2/2010 | Shukla | G06F 21/567 726/24 |
| 2010/0299759 A1* | 11/2010 | Kim | G06F 21/10 726/28 |
| 2012/0084792 A1* | 4/2012 | Benedek | G06F 9/544 719/313 |
| 2013/0139216 A1* | 5/2013 | Austin | G06F 21/12 726/1 |
| 2013/0275573 A1† | 10/2013 | Dalcher et al. | |
| 2013/0339646 A1* | 12/2013 | Dalcher | G06F 21/60 711/163 |
| 2014/0057610 A1* | 2/2014 | Olincy | H04M 3/42365 455/414.1 |
| 2014/0137183 A1* | 5/2014 | Russello | G06F 21/60 726/1 |
| 2014/0137184 A1* | 5/2014 | Russello | G06F 21/60 726/1 |
| 2014/0242945 A1 | 8/2014 | Zeng | |
| 2015/0332043 A1* | 11/2015 | Russello | G06F 11/30 726/23 |
| 2015/0347617 A1* | 12/2015 | Weinig | G06F 21/53 715/234 |
| 2016/0156774 A1* | 6/2016 | Campbell | H04M 1/72522 455/418 |

OTHER PUBLICATIONS

International Search Report and Written Opinion for PCT/US2015/012495 dated Jul. 9, 2015, 9 pages.

International Preliminary Report on Patentability issued in International Application No. PCT/US2015/012495 dated Jul. 25, 2017; 8 pages.

\* cited by examiner
† cited by third party

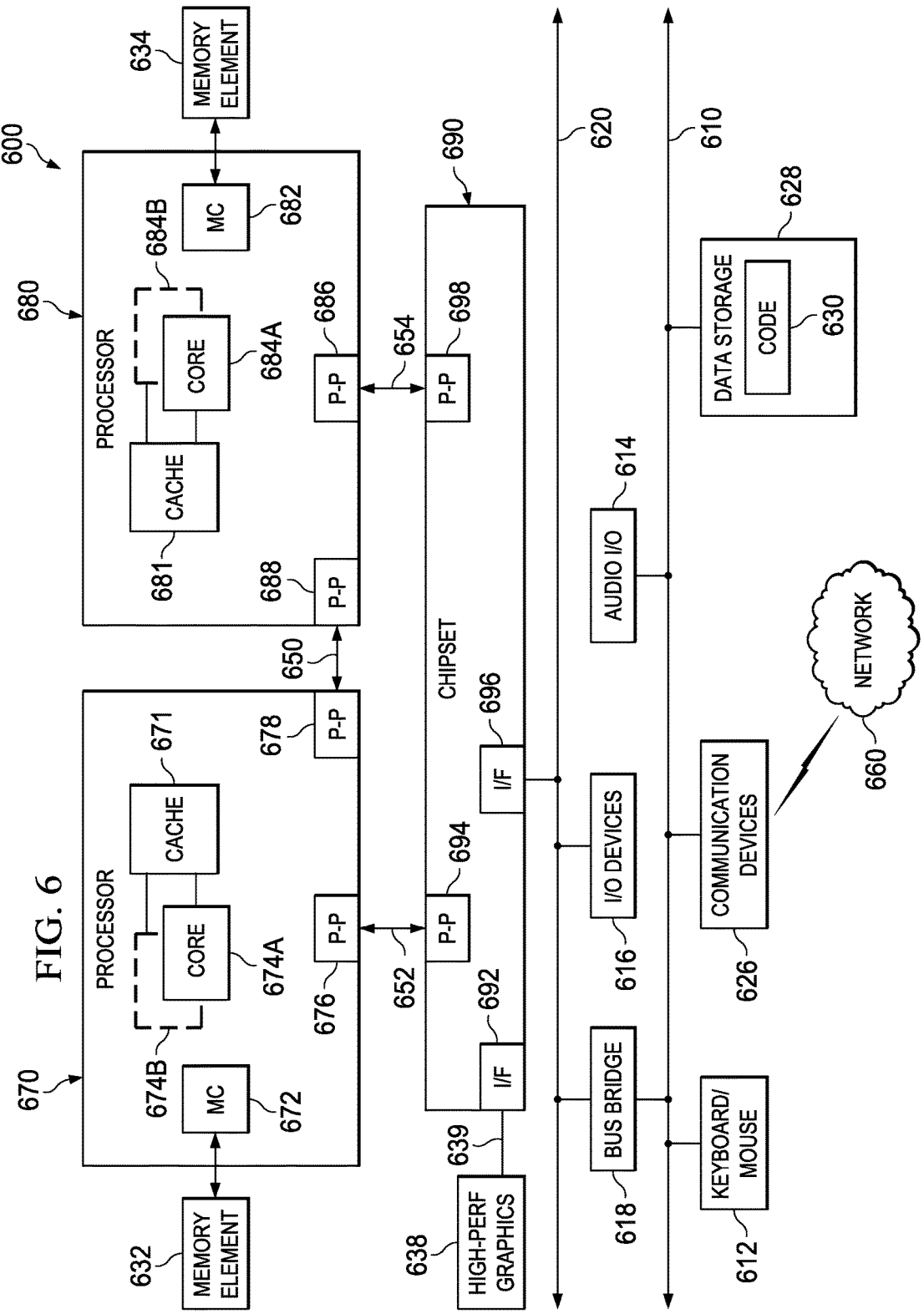

DETECTION OF MALICIOUS INVOCATION OF APPLICATION PROGRAM INTERFACE CALLS

PRIORITY DATA

This Application is a National Stage under 35 U.S.C. 371 of International Application PCT/US2015/012495 filed on Jan. 22, 2015, which is hereby incorporated by reference in its entirety.

TECHNICAL FIELD

This disclosure relates in general to the field of information security, and more particularly, to detection of malicious invocation of application program interface calls.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a block diagram illustrating an example computing system that is arranged in a point-to-point configuration in accordance with an embodiment;

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
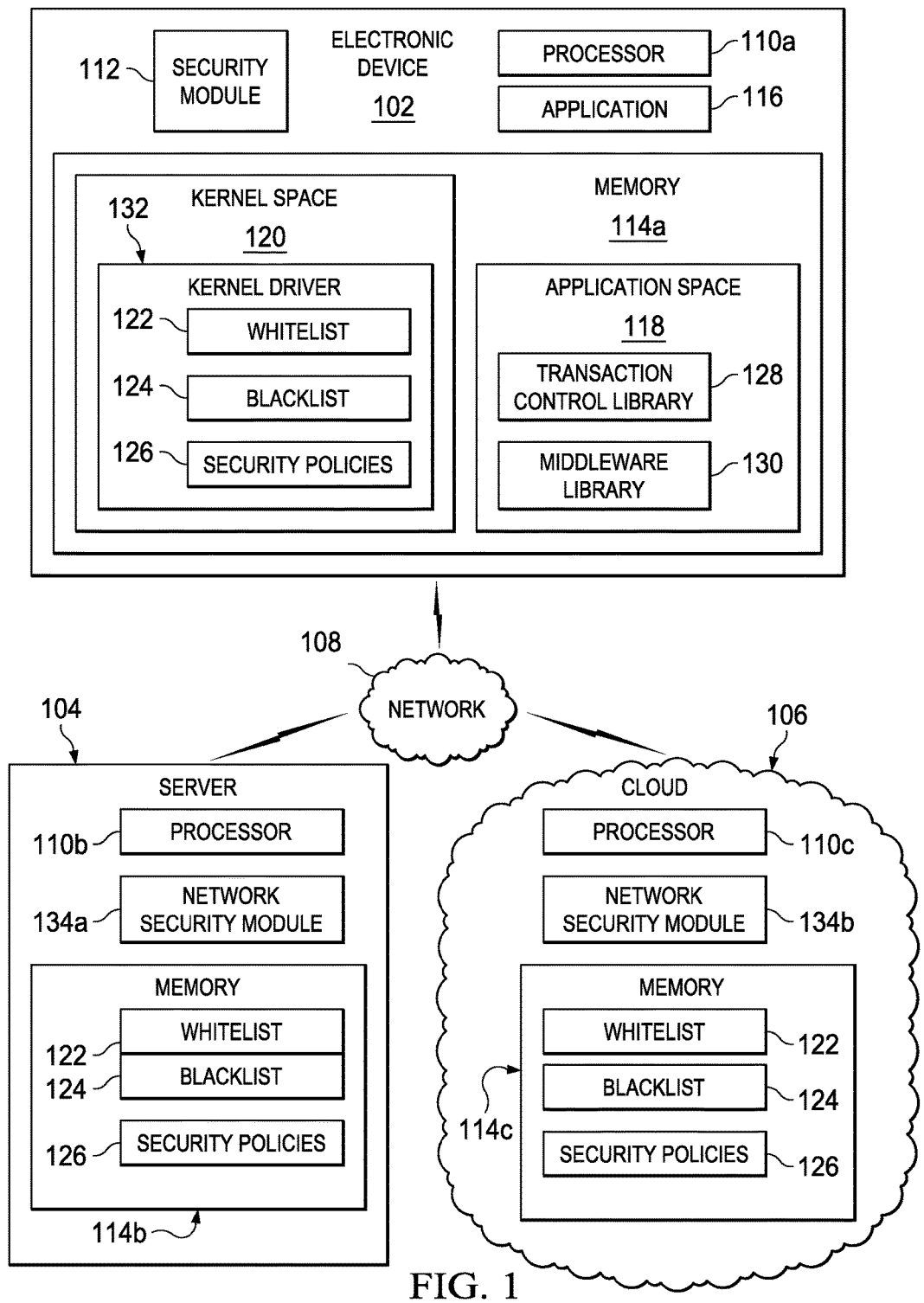
FIG. 1 is a simplified block diagram of a communication system for the detection of malicious invocation of application program interface calls in accordance with an embodiment of the present disclosure.

FIG. 1 is a simplified block diagram of a communication system 100 for the detection of malicious invocation of application program interface calls in accordance with an embodiment of the present disclosure. As illustrated in FIG. 1, an embodiment of communication system 100 can include electronic device 102, a server 104, and a cloud 106. Electronic device 102a can include a processor 110a, a security module 112, memory 114a, and an application 116. Memory 114a can include an application space 118 and a kernel space 120. Application space 118 can include a transaction control library 128 and a middleware library 130. Kernel space 120 can include a kernel driver 132. Kernel driver 132 can include a whitelist 122, a blacklist 124, and security policies 126. Server 104 can include a processor 110b, memory 114b, and a network security module 134a. Memory 114b can include whitelist 122, blacklist 124, and security policies 126. Cloud 106 can include a processor 110c, memory 114c, and a network security module 134b. Memory 114c can include whitelist 122, blacklist 124, and security policies 126. Electronic device 102, server 104, and cloud 106 can be in communication using network 108.

In example embodiments, communication system 100 can be configured to hook or access control any Android's API invocation by modifying the binder driver in the Android OS. Before reaching the actual implementation service, all the API calls flow through the binder kernel driver. Communication system 100 can be configured to hook and provide access control of Android APIs invocation for before the API call reaches its actual implementation service. The system includes a generic frame work which provides a software development kit to hook or access control any given Android system service API or binder transactions. Other academic implementations just target one attack or a particular use case and do not include a generic way of hooking to build solutions against multiple attacks.

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Android is a mobile operating system (OS) based on a Linux kernel. Currently, the Android OS is the leading mobile operating system in the market with a wide presence among consumers. The popularity of the Android OS means that it is often a target of malicious operators. One common technique used by malicious operators is to exploit the legitimate exposed APIs of the Android framework. Currently, there is not a framework available which can allow a security system to hook and access control Android's system service APIs invocation or binder transactions generically. What is needed is a security solution that provides a generic frame work by means of policies to dynamically hook into any given Android frame work's API. In an Android OS, the binder is the official IPC communication mechanism of Android which is internally used by all the Android framework APIs and all (or almost all) of the Android's API invocation goes through the binder driver.

A communication system for detection of malicious invocation of application program interface calls, as outlined in FIG. 1, can resolve these issues (and others) Communication system 100 may be configured to provide a generic policy driven framework to build security apps for hooking or access controlling Android system service APIs invocation or binder transactions to achieve access control or stopping a malicious attack. Android framework API's are implemented inside multiple services and these services are hosted inside a special daemon process called system server or context manager. An application calling an Android API gets a handle to remote services and calls exposed functions on the system server or context manager. The API calls are then marshalled to the actual service being hosted inside the system server via a binder inter-process communication which is implemented inside Android's binder kernel driver.

In a specific example, the framework is implemented by modifying Android's binder kernel driver. Inside the driver, the existing handling of BINDER_READ_WRITE ioctl's BC_TRANSACTION command can be modified. This is the IOCTL which is called from user space whenever an Android system service API is called and from here, binder driver further dispatches a call to actual destination service inside the system server in user space. Before the binder kernel driver passes the API calls to actual system services, the arguments of the API call can be unpacked and the name of the service and function being invoked can be acquired. Also, the process details invoking the calls can be acquired and the details can be filtered through a security module (e.g., security module 112 or network security module 134a or 134b).

The security module can specify policies in terms of attributes for filtering the call. For example the attributes can include, but are not limited to a service name, function name, action to be taken, etc. Actions can be supported such as allow the API call, block or deny the API call, block the API call for few seconds, and in same context notify the security module with details of the API call like invoking process details, service name, function being invoked and argument, so the security module can further analyze the arguments or send the calls to some other framework for further scanning and return the verdict of allow or block to the kernel frame work. The allow and block actions allow for access control whereas the ask action allows the system to simulate the API hooking. When an allow or block decision is finally made, the event can be raised to the security module about the decision with metadata details like, action performed, target API details and process details which invoked the API. The decision and metadata details can be used by a security system to create or supplement whitelist 122, blacklist 124, and generally improve the detection of malicious activities.

Communication system 100 can be configured to build policy driven applications to support various BYOD use cases (e.g., allowing and denying various operations). Communication system 100 can also be configured to help stop attacks like activity phishing (hooking into start Activity( ), pauseActivity( ), resume Activity( ) or all kinds of Activity lifecycle APIs). In addition, communication system 100 can be configured to help stop attacks like eavesdropping on messages and contacts. Further, communication system 100 can be configured to help stop attacks related to data loss like silent message uploads to CNC server or silent messages ending to CNC server (hooking into send Message( ) or send Data( ) APIs). The system can build a strong intent firewall to control the ways intents are getting broadcasted within the system (e.g., hooking into broadcastIntent( ) API). Communication system 100 can also be configured to hook into Android's packaging APIs to try to prevent installation of malicious applications or deletion of a security application by a rouge application (e.g., hooking into installPackage( ) or installPackageUser( ) APIs). The system can attempt to prevent any rouge app to stop the service of a security application hooking into a startService( ), stopService( ), bindService( ) or all kinds of service lifecycle APIs. In addition, communication system 100 can be configured to help prevent permission re-delegation attacks. Whitelist 122 and blacklist 124 can be used to restrict or access control various operations by a given applications. Communication system 100 can be configured to help prevent against user interface (UI) state inference kinds of attacks by stopping rouge application from doing targeted activity phishing. Further, communication system 100 can be configured to hook into activity lifecycle APIs and when a privilege application is detected (e.g., a banking application is starting) log any inactivity and only allow start Activity( ) from known legitimate applications.

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, server 104, and cloud 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic device 102, server 104, and cloud 106 can include memory elements for storing information to be used in the operations outlined herein. Each of electronic device 102, server 104, and cloud 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element. Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, server 104, and cloud 106 may include software modules (e.g., security module 112 and network security modules 134*a* and 134*b*) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, server 104, and cloud 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor'.

Electronic device 102 can each be a network element that runs an Android OS and includes, for example, desktop computers, laptop computers, mobile devices, personal digital assistants, smartphones, tablets, or other similar devices. Server 104 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100. Although security module 112 is represented in FIG. 1 as being located in electronic device 102, this is for illustrative purposes only. Security module 112 could be combined or separated in any suitable configuration. Furthermore, security module 112 could be integrated with or distributed in another network accessible by electronic device 102 such as server 104 or cloud 106. Cloud 106 is configured to provide cloud services to electronic device 102. Cloud services may generally be defined as the use of computing resources that are delivered as a service over a network, such as the Internet. Typically, compute, storage, and network resources are offered in a cloud infrastructure, effectively shifting the workload from a local network to the cloud network.

Figure 2:
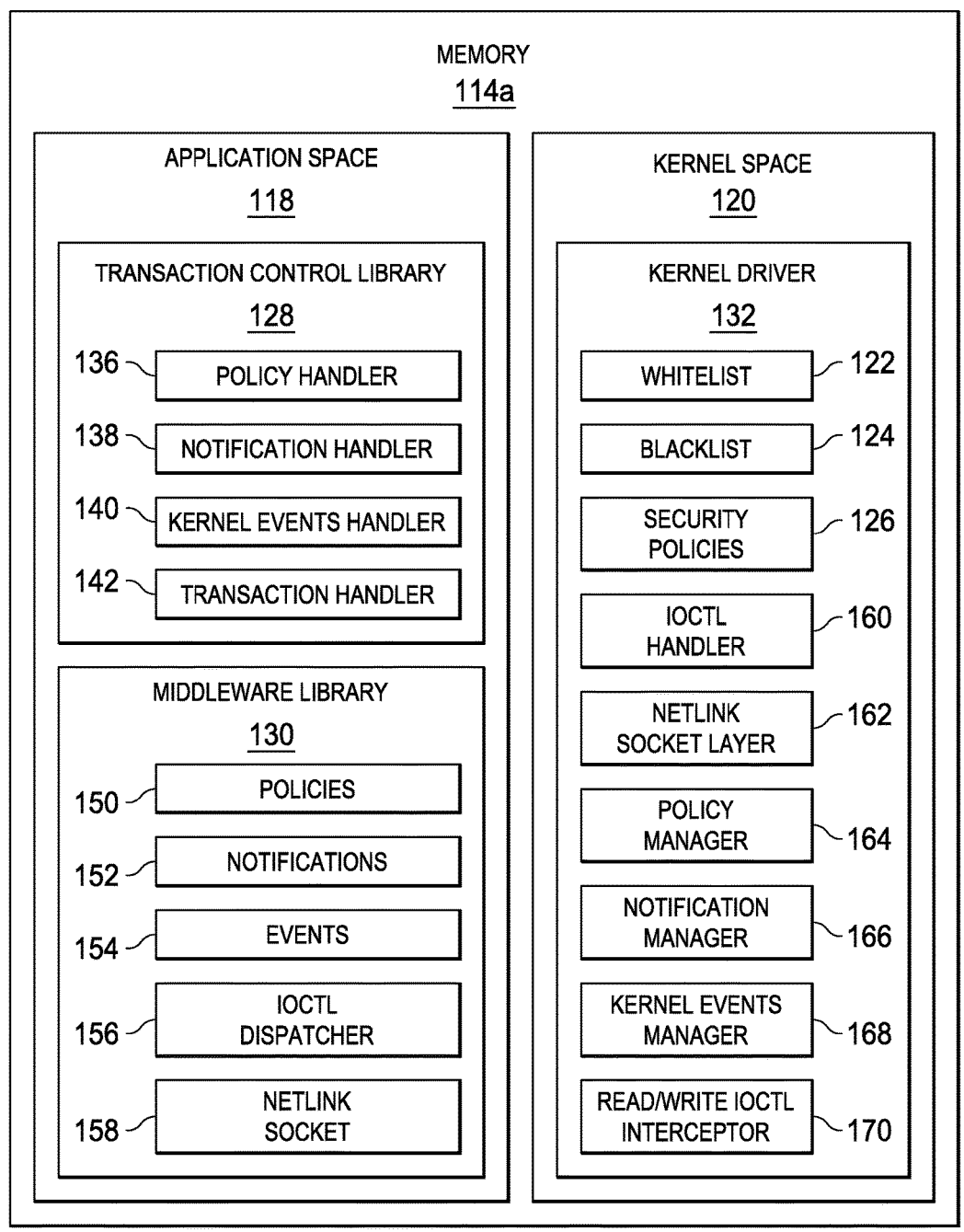
FIG. 2 is a simplified diagram of a portion a communication system for the detection of malicious invocation of application program interface calls in accordance with an embodiment of the present disclosure.

Turning to FIG. 2, FIG. 2 is a simplified block diagram of a portion of a communication system 100 for the detection of malicious invocation of application program interface calls in accordance with an embodiment of the present disclosure. As illustrated in FIG. 2, electronic device 102 can include application space 118 and kernel space 120. Application space 118 can include transaction control library 128 and middleware library 130. Transaction control library 128 can include a policy handler 136, a notification handler 138, a kernel events handler 140, and a transaction handler 142. Middleware library 130 can include policies 150, notifications 152, events 154, an input/output control (IOCTL) dispatcher 156, and a netlink socket 158. Kernel space 120 can include kernel driver 132. Kernel driver 132 can include whitelist 122, blacklist 124, security policies 126, an IOCTL handler 160, a netlink socket layer 162, a policy manager 166, a kernel events manager 168, and a read/write IOCTL interceptor 170.

Transaction control library 128 is the main Java library that exposes all the functionality of the system and interacts with the middleware library 130 whenever any exposed APIs are called. Transaction control library 128 can provides API for policy management, listening to framework kernel events, etc. Policy handler 136 can have functionality related to policy configuration or policy management. Policy handler 136 can be configured to exposes the APIs for policy management and redirect the calls to policies 150 which in-turn can call policy manager 164. Notification handler 138 can pull allow or block verdict events from notification manager 166 using notifications 152. Kernel events handler 140 can receive sync and async callbacks from netlink socket 158. The sync and async callbacks can be generated by kernel events manager 168.

Because the APIs are provide in Java, for Java to call kernel mode code middleware library 130 can be configured to act as a bridge or middleware between transaction control library 128 and kernel driver 132. Policies 150 indicate the code and functionality for preprocessing before sending a call to policy manager 164. Notifications 152 can be configured to interact with notification manager 166. Events 154 can call and receive callbacks from kernel event manager 168 using netlink socket 158. IOCTL dispatcher 156 can use exposed IOCTL code for the exposed API and other related functionality of the framework. Netlink socket 158 can be configured to listen over the socket to for the sync and async callback from netlink socket layer 162.

Whitelist 122 can include entries of known clean or trusted applications, code, strings, etc. Blacklist 124 can include entries of known malicious or untrusted applications, code, strings, etc. Security policies 126 can includes policies on how to handle identified or suspect malware. In a specific example, the format of the policy can include a source and a target. The source can include a list of processes that are invoking the system APIs or process that should be monitored. The target can include the APIs being invoked (e.g., API interface name and functions) or APIs that are being monitored for source applications. All the APIs for the system are exposed by means of IOCTL and IOCTL handler 160 can provide an entry point for transaction control library to call into kernel driver 132. Netlink socket layer 162 can be used by kernel events manager 168 to send sync and async callbacks to transaction control library 128. Netlink socket layer 162 can communicate over Linux sockets between the kernel and the user mode. Policy manager 164 can be configured to provide functionality to maintain policies inside memory in lookup-able data structures, configured for API access controlling and hooking. Policy manager 164 can also takes care of matching given APIs and process metadata with configured policies and provide the decision on how to handle the APIs (e.g., allo-block-hook). Notification manager 166 can be configured to provide functionality to add allow or block notifications when a decision to allow or block an API call is made by policy manager 164. Notification manager 166 can maintain the notification inside a queue in memory so that security module 112 can pull all these notification using transaction control library. Kernel events manager 168 can be configured to provide functionality to send callbacks from kernel driver 132 to user mode (e.g., transaction control library 128) and allow kernel driver 132 to send synchronous and asynchronous callbacks to transaction control library. Read/write IOCTL interceptor 170 can be configured to intercept BINDER_READ_WRITE IOCTL of the binder driver (where the API call comes from) and extract the API and caller app and other related metadata for further processing.

Along with read/write IOCTL interceptor 170 inside kernel driver 132, the system can also include components for keeping policies in memory, managing the decision events in memory and components to call back user mode (e.g., an ASK callback). Transaction control library 128, can specifying policies in terms of service name and function name, and keep some metadata about all the android system service APIs and their arguments type, so that while getting ASK call back, the security module 112 can read the invoked APIs arguments and also specify a policy in terms of a service name and a function name.

Figure 3:
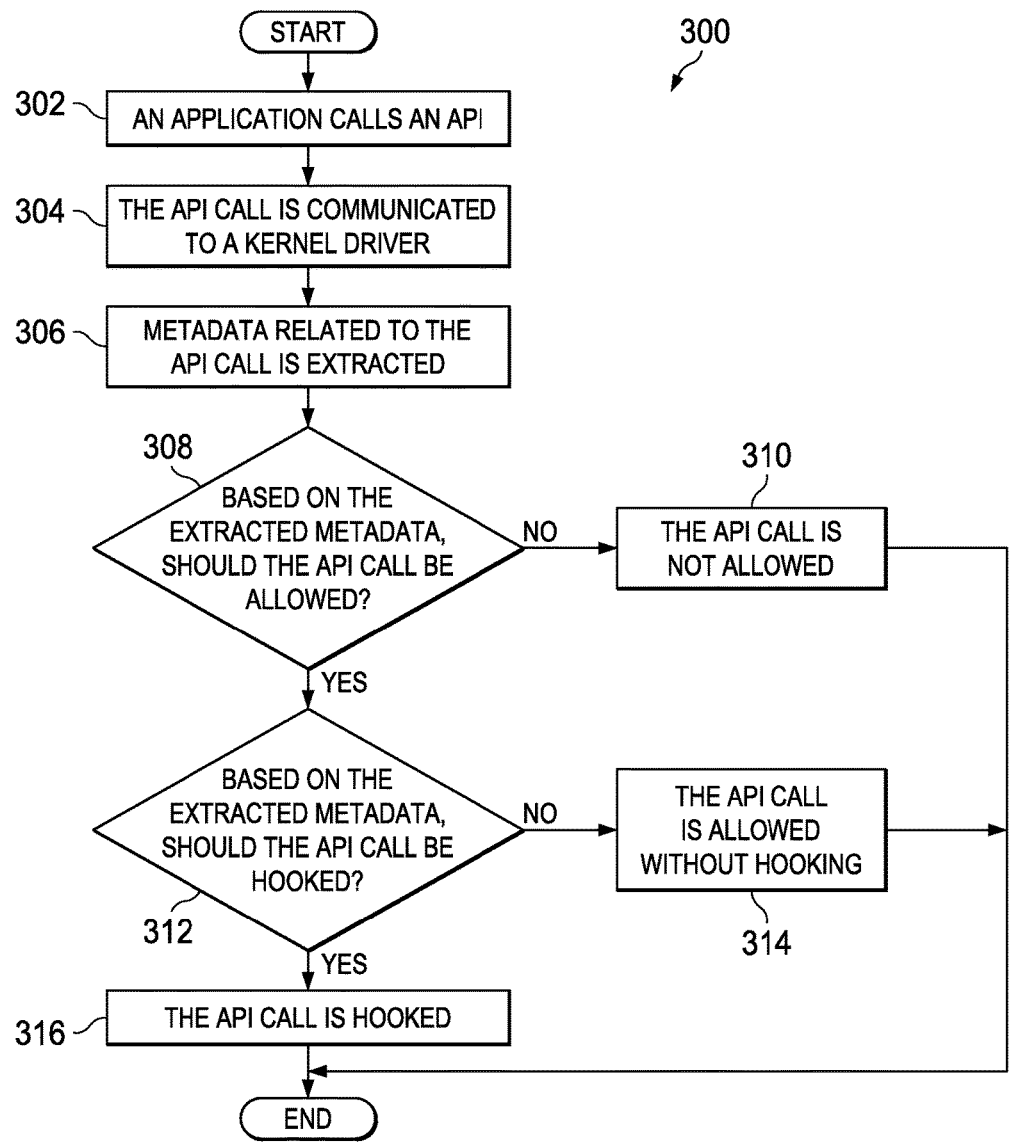
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with the detection of malicious invocation of application program interface calls, in accordance with an embodiment. At 302, an application calls an API. At 304, the API call is communicated to a kernel driver. At 306, metadata related to the API call is extracted. At 308, the system determines if, based on the extracted metadata, the API call should be allowed. If the API call should not be allowed, then the API call is not allowed, as in 310. If the API call should be allowed, then the system determines, based on the extracted metadata, if the API call should be hooked, as in 312. If the API call should not be hooked, then the API call is allowed without hooking, as in 314. If the API call should be hooked, then the API call is hooked, as in 316.

Figure 4:
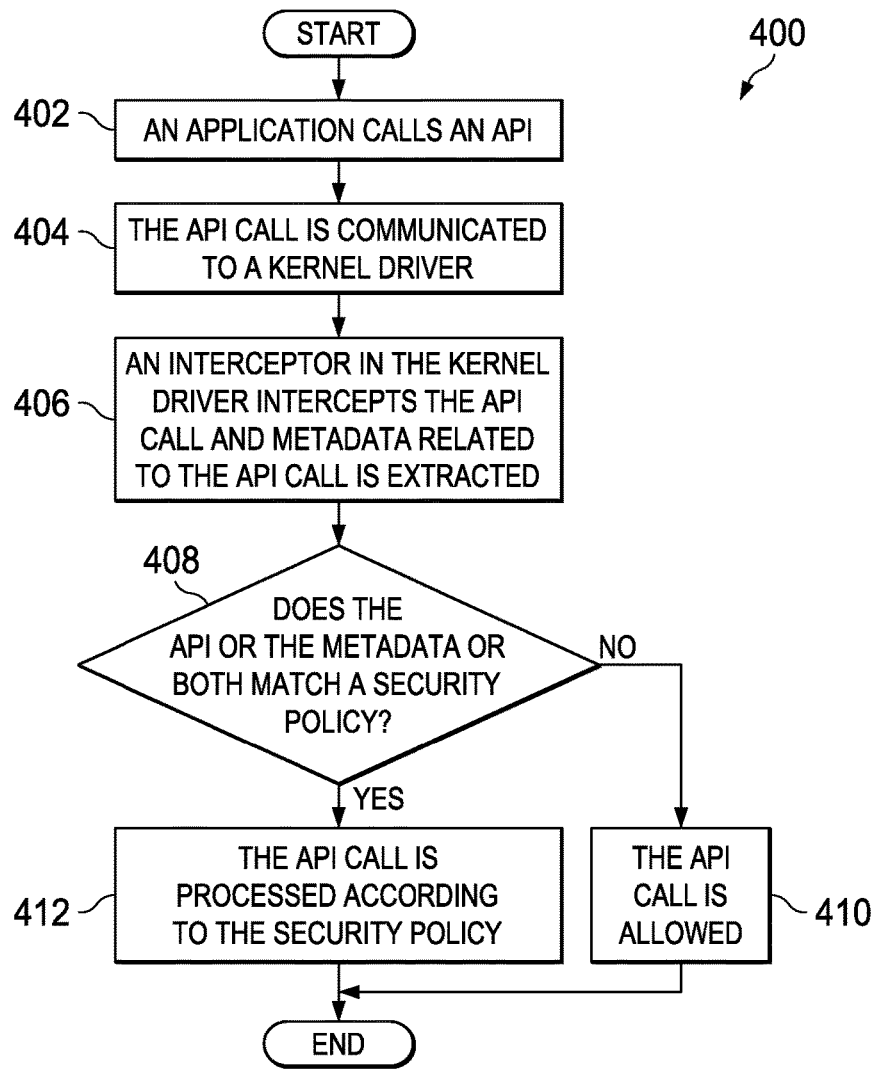
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with the detection of malicious invocation of application program interface calls, in accordance with an embodiment. At 402, an application calls an API. At 404, the API call is communicated to a kernel driver. At 406, an interceptor in the kernel driver intercepts the API call and metadata related to the API call is extracted. At 408, the system determines if the API or the metadata or both match a security policy. If neither the API or the metadata match a security policy, then the API call is allowed, as in 410. If the API or the metadata or both match a security policy, then the API is processed according to the security policy, as in 412.

Figure 5A:
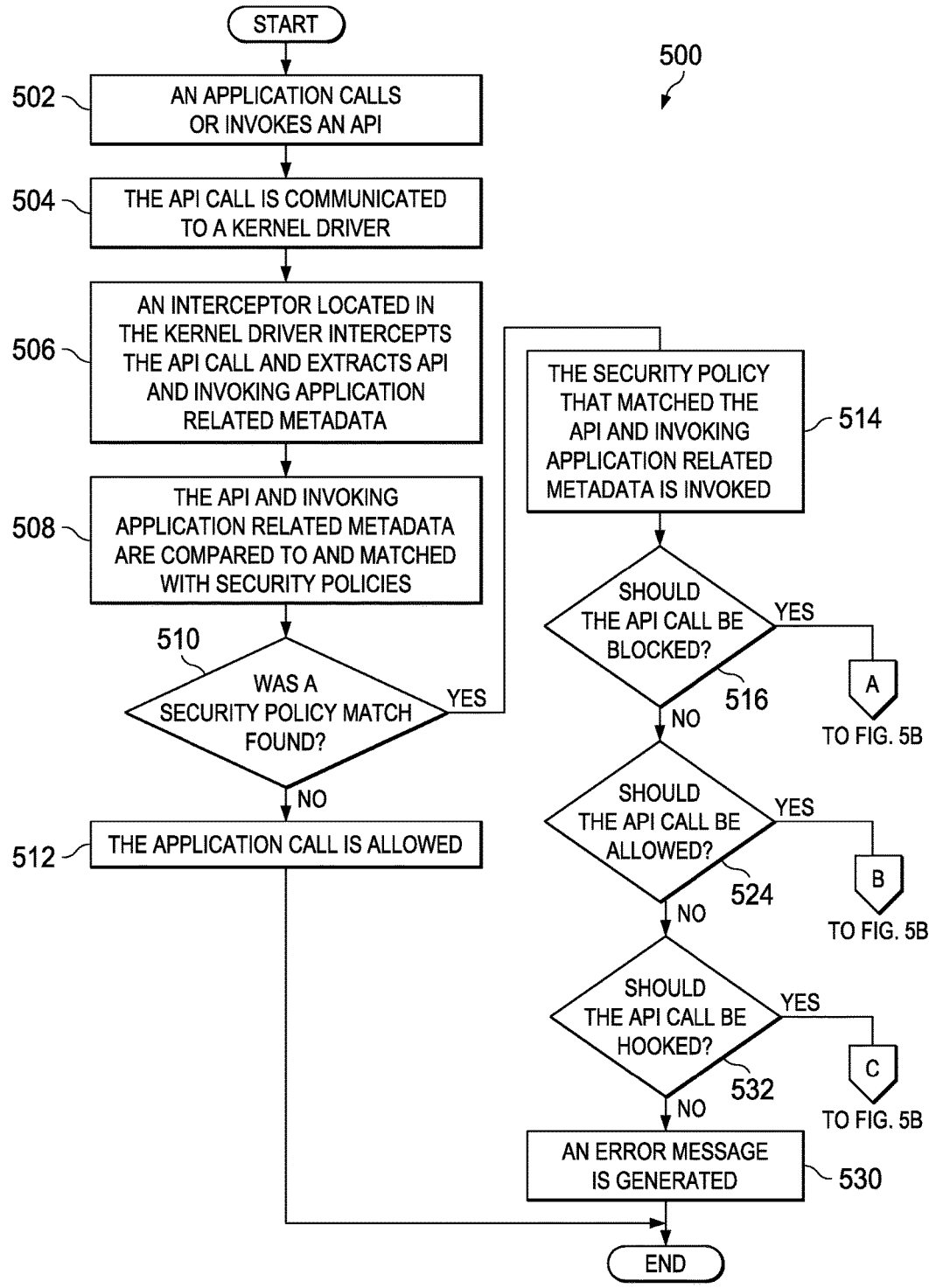
FIG. 5A is a simplified flowchart illustrating potential operations that may be associated with the communication system in accordance with an embodiment.
Figure 5B:
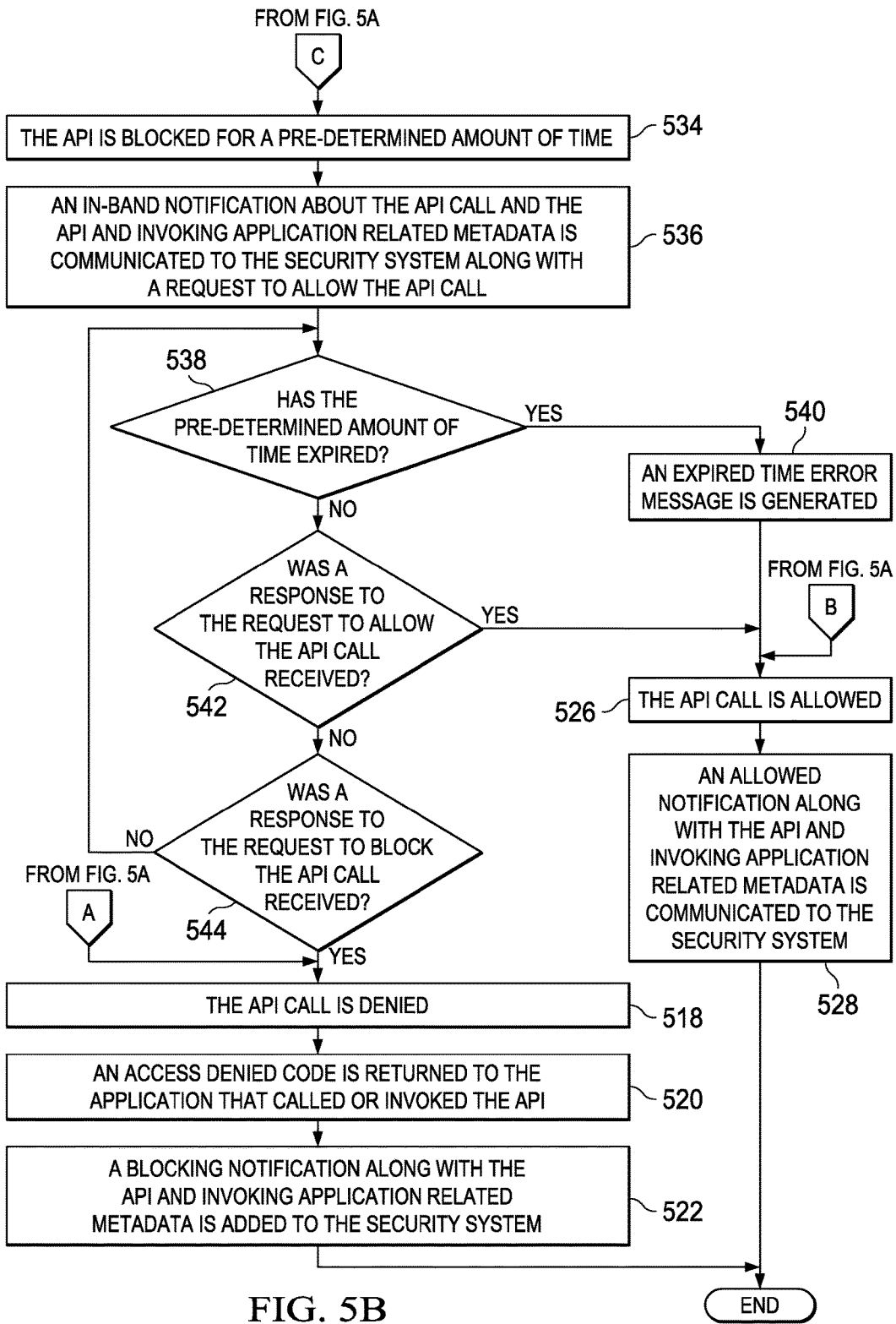
FIG. 5B is a simplified flowchart illustrating potential operations that may be associated with the communication system in accordance with an embodiment.

Turning to FIGS. 5A and 5B, FIGS. 5A and 5B are an example flowchart illustrating possible operations of a flow 500 that may be associated with the detection of malicious invocation of application program interface calls, in accordance with an embodiment. At 502, an application calls or invokes an API. At 504, the API call is communicated to a kernel driver. At 506, an interceptor located in the kernel driver intercepts the API call and extracts API and invoking application related data. At 508, the API and invoking application related metadata are compared to and matched, with security policies. At 510, the system determines if a security policy match as found. If a security policy match was not found, then the application call is allowed, as in 512.

If a security policy match was found, then the security policy that matched the API and invoking application related metadata is invoked, as in 514.

At 516, the system determines if the API call should be blocked. For example, the security policy that matched the API and invoking application related metadata may indicate that the API should be blocked. If the API call should be blocked, then the API call is denied or blocked, as in 518 (see FIG. 5B). At 520, an access denied code is returned to the application that called or invoked the API. At 522, a blocking notification along with the API and invoking application related metadata is added to the security system. For example, the API and invoking application related metadata may be sent to server 104 or cloud 106 to be used by the security system.

Going back to 516 (see FIG. 5A), if the API call should not be blocked, then the system determines if the API call should be allowed, as in 524. If the API call should be allowed, then the API call is allowed, as in 526 (see FIG. 5B). At 528, an allowed notification along with the API and invoking application related metadata is communicated to the security system. For example, the API and invoking application related metadata may be sent to server 104 or cloud 106 to be used by the security system.

Going back to 524 (see FIG. 5A), if the API call should not be allowed, then the system determines if the API call should be hooked, as in 530. If the API call should not be hooked, then a error messages is generated, as in 530. If an API call should be hooked, then the API is blocked for a pre-determined amount of time, as in 532 (see FIG. 5B). At 534, an in-band notification about the API call and the API and invoking application related metadata is communicated to the security system along with a request to allow the call. For example, notification about the API call and the API and invoking application related metadata can be communicated to security module 112 or network security module 134a or 134b. In an embodiment, an in-band notification about the API call, the API, and metadata related to the application invoking the API call is communicated to the security system and the kernel framework. At 536, the system determines if the pre-determined amount of time has expired. For example, the system may wait a predetermined number of cycles for a response from the security system. If the amount of time has expired, then an error message is generated as in 530. At 526, the API call is allowed. If the amount of time has not expired, then the system determines if a response to allow the API call was received, as in 538. If a response to allow the API call was received, then the API call is allowed, as in 526. If a response to allow the API call was not received, then the system determines if a response to block the API call was received, as in 540. If a response to block the API call was received, then the API call denied or blocked, as in 518. If a response to block the API call was not received, then the system determines if the pre-determined amount of time has expired, as in 536.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the network elements of communication system 100 may be configured in the same or similar manner as computing system 600.

As illustrated in FIG. 6, system 600 may include several processors, of which only two, processors 670 and 680, are shown for clarity. While two processors 670 and 680 are shown, it is to be understood that an embodiment of system 600 may also include only one such processor. Processors 670 and 680 may each include a set of cores (i.e., processor cores 674A and 674B and processor cores 684A and 684B) to execute multiple threads of a program. The cores may be configured to execute instruction code in a manner similar to that discussed above with reference to FIGS. 1-5. Each processor 670, 680 may include at least one shared cache 671, 681. Shared caches 671, 681 may store data (e.g., instructions) that are utilized by one or more components of processors 670, 680, such as processor cores 674 and 684.

Processors 670 and 680 may also each include integrated memory controller logic (MC) 672 and 682 to communicate with memory elements 632 and 634. Memory elements 632 and/or 634 may store various data used by processors 670 and 680. In alternative embodiments, memory controller logic 672 and 682 may be discreet logic separate from processors 670 and 680.

Processors 670 and 680 may be any type of processor and may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
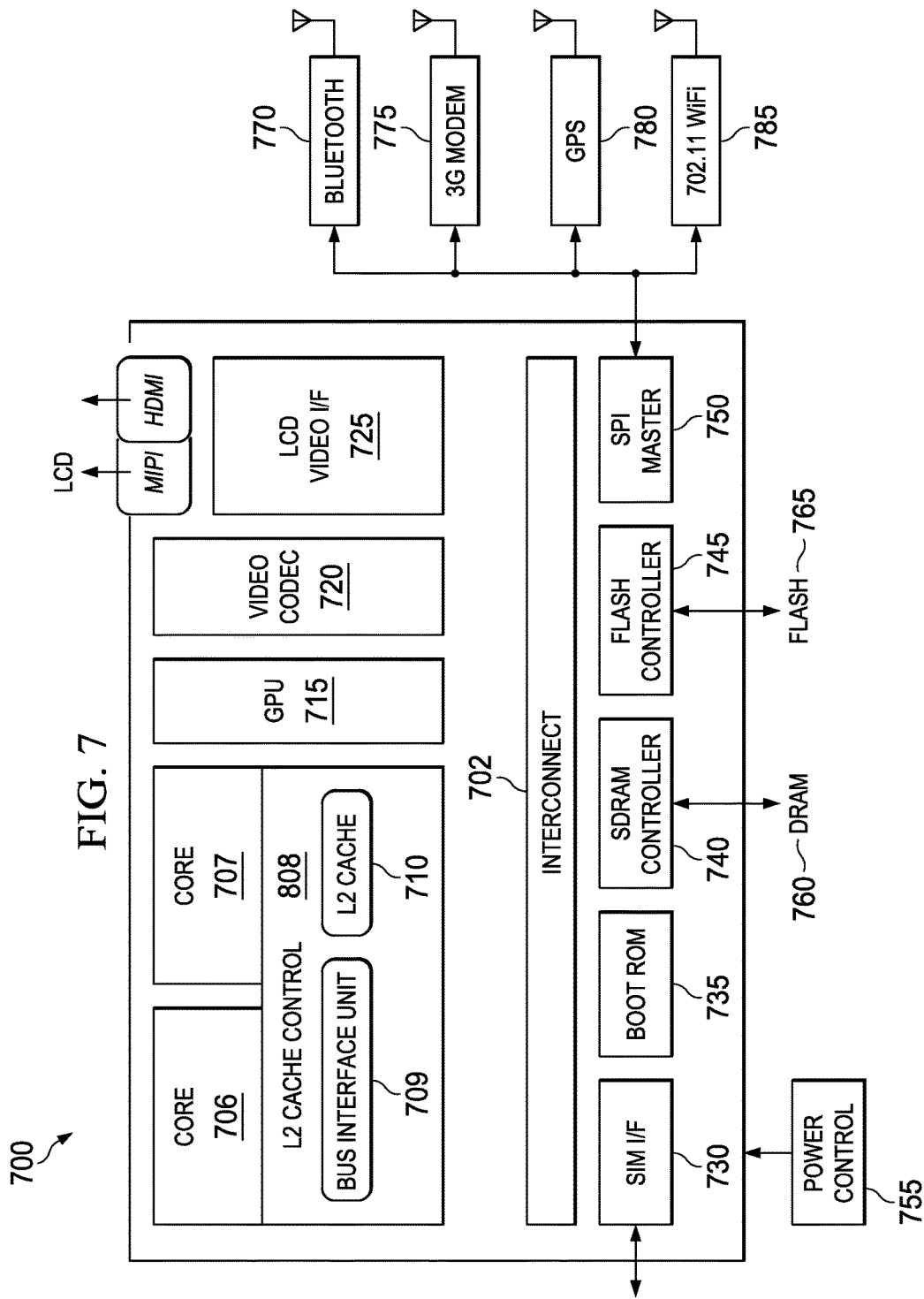
FIG. 7 is a simplified block diagram associated with an example ARM ecosystem system on chip (SOC) of the present disclosure.

Turning to FIG. 7, FIG. 7 is a simplified block diagram associated with an example ARM ecosystem SOC 700 of the present disclosure. At least one example implementation of the present disclosure can include the detection of malicious strings features discussed herein and an ARM component. For example, the example of FIG. 7 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 705-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LCD.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 755. In addition, one or more example embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
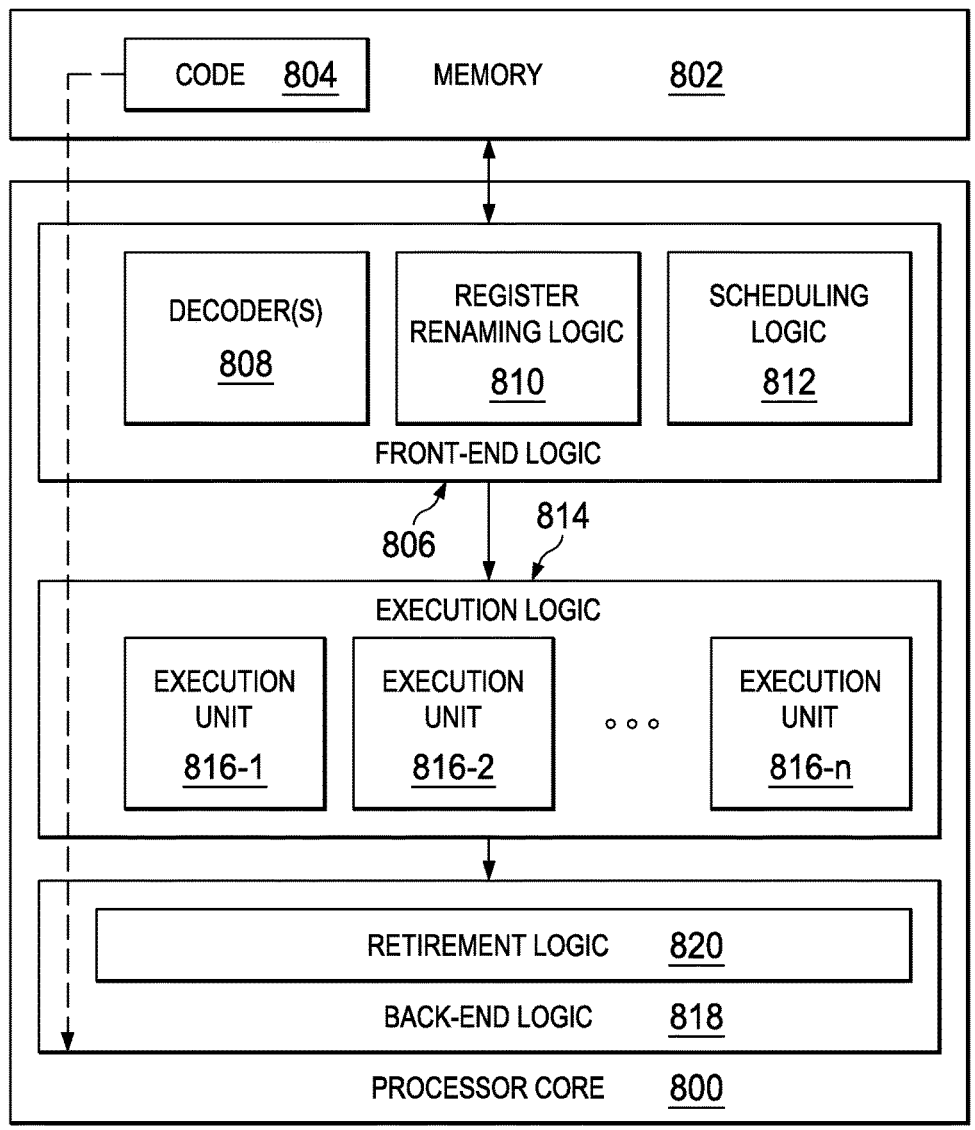
FIG. 8 is a block diagram illustrating an example processor core in accordance with an embodiment.

FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 674a, 674b, 684a, and 684b shown and described with reference to processors 670 and 680 of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 3-5B) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. At least one non-transitory computer-readable medium comprising one or more instructions that when executed by at least one processor, cause the processor to:
receive, by a kernel driver executed by the at least one processor, an application program interface (API) call, wherein the kernel driver is included within a kernel space;
extract, with the kernel driver, metadata from the API call;
determine, with the kernel driver, that the API call should be hooked based on the extracted metadata;
hook, with the kernel driver, the API call;
communicate the API call and the extracted metadata to a security module, wherein the security module determines if the API call should be allowed or denied; and
allow the API call if a response from the security module is not received after a predetermined amount of time has passed from when the API call and the extracted metadata was communicated to the security module.

2. The at least one nom-transitory computer-readable medium of claim 1, wherein the kernel driver is a binder kernel driver.

3. The at least one non-transitory computer-readable medium of claim 2, wherein an interceptor in the kernel driver intercepts the API call.

4. The at least one non-transitory computer-readable medium of claim 2, wherein a policy manager inside the kernel driver determines that the API call should be hooked based on the extracted metadata.

5. The at least one non-transitory computer-readable medium of claim 2, wherein the extracted metadata is compared to a security policy to determine that the API call should be hooked.

6. The at least one nom-transitory computer-readable medium of claim 5, wherein the security policy is located in the kernel driver.

7. An apparatus comprising:
a hardware processor configured to execute a kernel driver, wherein the kernel driver is configured to:
receive an application program interface (API) call, wherein the kernel driver is included within a kernel space;
extract metadata from the API call;
determine that the API call should be hooked based on the extracted metadata;
hook the API call;
communicate the API call and the extracted metadata to a security module, wherein the security module determines if the API call should be allowed or denied; and
allow the API call if a response from the security module is not received after a predetermined amount of time has passed from when the API call and the extracted metadata was communicated to the security module.

8. The apparatus of claim 7, wherein the kernel driver is a binder kernel driver.

9. The apparatus of claim 8, wherein an interceptor in the kernel driver intercepts the API call.

10. The apparatus of claim 8, wherein a policy manager inside the kernel driver determines that the API call should be hooked based on the extracted metadata.

11. The apparatus of claim 8, wherein the extracted metadata is compared to a security policy to determine that the API call should be hooked.

12. The apparatus of claim 11, wherein the security policy is located in the kernel driver.

13. A method comprising:
receiving an application program interface (API) call at a kernel driver, wherein the kernel driver is included within a kernel space;
extracting metadata from the API call with the kernel driver;
determining, with the kernel driver, that the API call should be hooked based on the extracted metadata;
hooking, with the kernel driver, the API call;
communicate the API call and the extracted metadata to a security module, wherein the security module determines if the API call should be allowed or denied; and
allow the API call if a response from the security module is not received after a predetermined amount of time has passed from when the API call and the extracted metadata was communicated to the security module.

14. The method of claim 13, wherein the kernel driver is a binder kernel driver.

15. The method of claim 14, wherein an interceptor in the kernel driver intercepts the API call.

16. The method of claim 14, wherein a policy manager inside the kernel driver determines that the API call should be hooked based on the extracted metadata.

17. The method of claim 14, wherein the extracted metadata is compared to a security policy in the kernel driver to determine that the API call should be hooked.

18. A system for detecting and mitigating malicious invocation of sensitive code, the system comprising:
a hardware processor configured to execute a binder kernel driver, wherein the binder kernel driver is configured to:
receive an application program interface (API) call, wherein the binder kernel driver is included within a kernel space;
extract metadata from the API call;
determine that the API call should be hooked based on the extracted metadata;
hook the API call;
communicate the API call and the extracted metadata to a security module, wherein the security module determines if the API call should be allowed or denied; and
allow the API call if a response from the security module is not received after a predetermined amount of time has passed from when the API call and the extracted metadata was communicated to the security module.

19. The system of claim 18, wherein a policy manager inside the binder kernel driver compares the extracted metadata to a security policy in the binder kernel driver and determines that the API call should be hooked based on the extracted metadata.

* * * * *

UNITED STATES PATENT AND TRADEMARK OFFICE
CERTIFICATE OF CORRECTION

PATENT NO. : 10,339,303 B2
APPLICATION NO. : 14/780536
DATED : July 2, 2019
INVENTOR(S) : Kunal Mehta et al.

Page 1 of 1

It is certified that error appears in the above-identified patent and that said Letters Patent is hereby corrected as shown below:

In the Claims

In Column 13, Line 41, in Claim 2, delete "nom;" and insert -- non --, therefor.

In Column 13, Line 55, in Claim 6, delete "nom;" and insert -- non --, therefor.

Signed and Sealed this
Twenty-seventh Day of August, 2019

Andrei Iancu
*Director of the United States Patent and Trademark Office*